Sept. 23, 1952 C. W. RIISE 2,611,673
DISPENSING MECHANISM FOR CYLINDRICAL ARTICLES
Filed Nov. 22, 1946 4 Sheets-Sheet 1

Inventor
CHARLES W. RIISE,
By McMorrow, Berman & Davidson
Attorneys

Sept. 23, 1952　　　　　C. W. RIISE　　　　　2,611,673
DISPENSING MECHANISM FOR CYLINDRICAL ARTICLES
Filed Nov. 22, 1946　　　　　　　　　　　　4 Sheets-Sheet 2
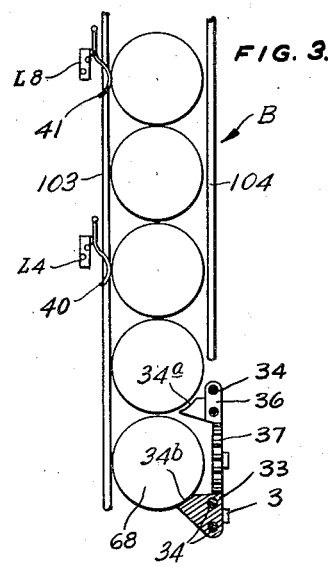
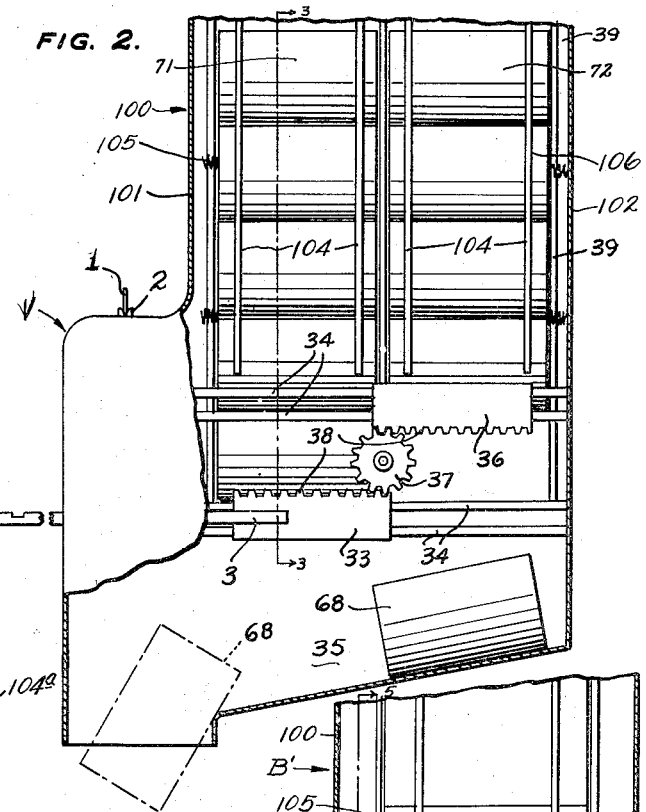
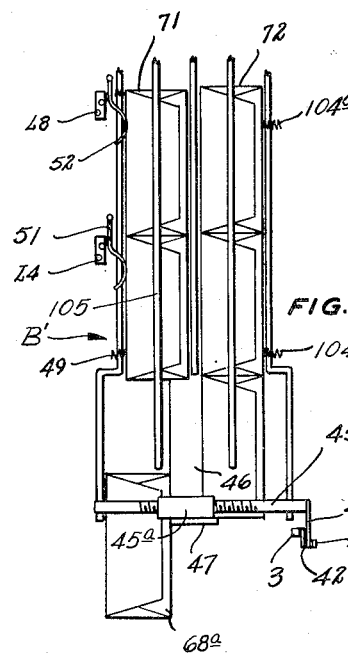
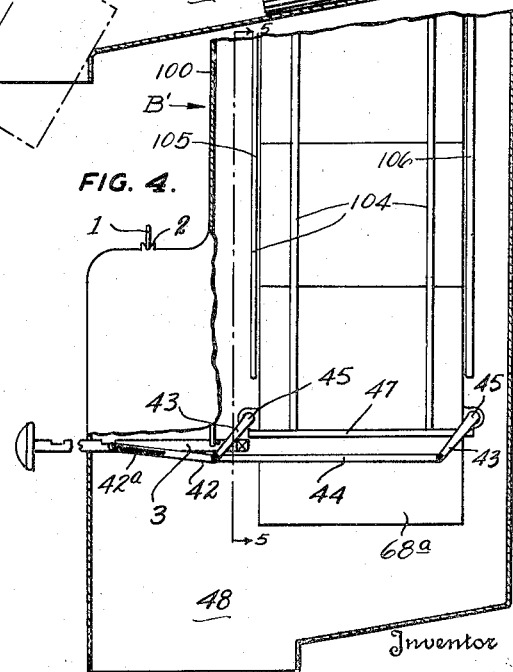
Inventor
CHARLES W. RIISE,
By McMorrow, Beeman & Davidson
Attorneys

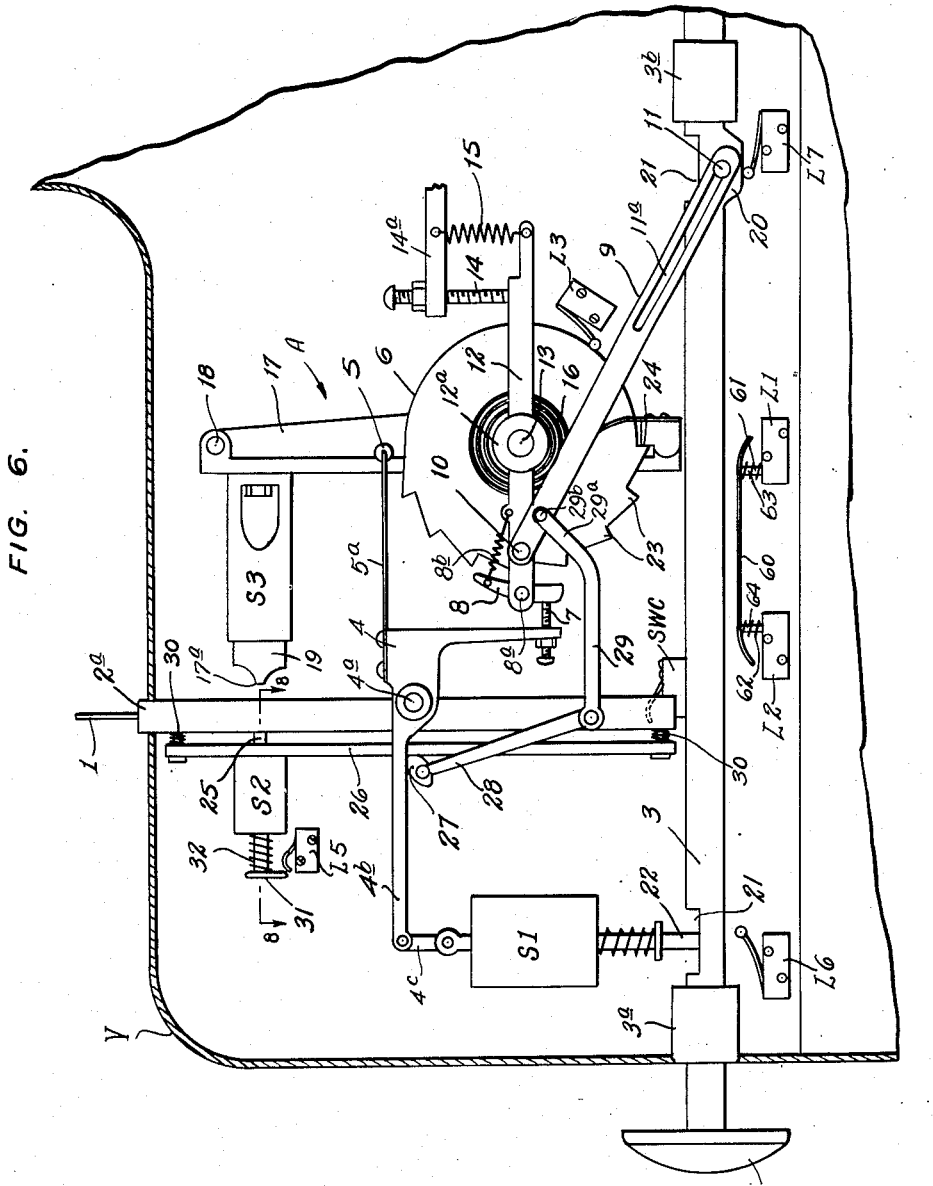

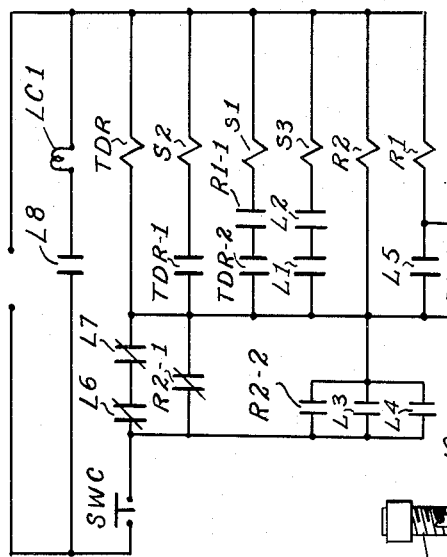
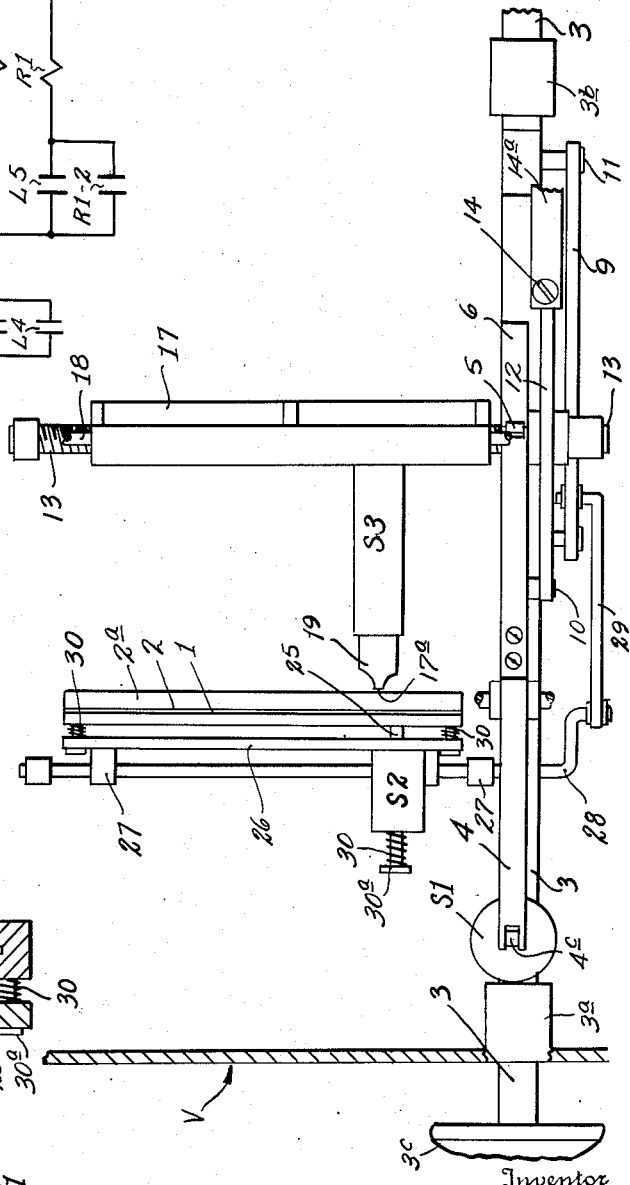
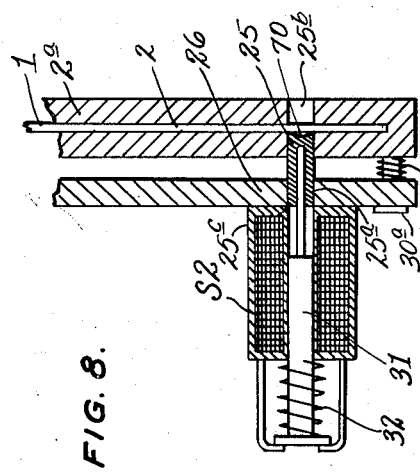

Patented Sept. 23, 1952

2,611,673

UNITED STATES PATENT OFFICE 2,611,673

DISPENSING MECHANISM FOR CYLINDRICAL ARTICLES

Charles W. Riise, Berkeley, Calif.

Application November 22, 1946, Serial No. 711,568

3 Claims. (Cl. 312—48)

This invention relates to improved apparatus for dispensing packaged merchandise, wherein the operation thereof is contingent upon the insertion of a special punch card in the apparatus, and whose manual operation causes punching and printing of the card, to show the purchase price to be paid by the customer for the packages dispensed, and to act as package inventory check for the establishment in which the apparatus is located.

The primary object of this invention is the provision of apparatus of this character affording a new and improved approach to the merchandising of food, and the like, which embodies many features advantageous to both the management and the customers not obtainable in a conventional type of store.

Another object of this invention is the provision of a dispensing system of the character above described which will provide faster and more efficient delivery of food packages to customers and afford the store management unusual opportunity for attractive food display with a maximum of cleanliness and orderliness, and minimum of spoilage otherwise resulting from exposure and from handling of the food items by customers and store personnel.

Still another object of this invention is the provision of a dispensing system of the character described above which will provide a continuous inventory record of the kinds and amounts of merchandise dispensed and cash receipts for the dispensed packages, and a system which will eliminate the possibility of customer or employee dishonesty.

Still a further object of this invention is the provision of a dispensing system of the character described which will be economical both to the customer and to the management through reduction of personnel expense and economy of the operation through efficient, large scale merchandising. This system will also offer unlimited possibilities in the field of advertisement on the part of the management.

Still further improvements, novelties and advantages of this invention will be apparent from the following description, taken in connection with the accompanying drawings in which:

Figure 2 is a side elevation, partly broken away, showing mechanism for dispensing cylindrical packages, such as cans.

Fig. 3 is a vertical transverse section taken on line 3—3 of Fig. 2.

Fig. 4 is a side elevation, partly broken away, showing operating mechanism, with an operating rod shown in a pushed in position, of mechanism for dispensing rectangular packages.

Fig. 5 is a vertical section taken on line 5—5 of Fig. 4.

Fig. 6 is a side elevation, partly broken away, showing the card punch mechanism.

Fig. 7 is a top plan view of Fig. 6.

Fig. 8 is a vertical section taken on line 8—8 of Fig. 6.

Figure 9 is a wiring diagram of the electrical circuits involved.

Figure 1:
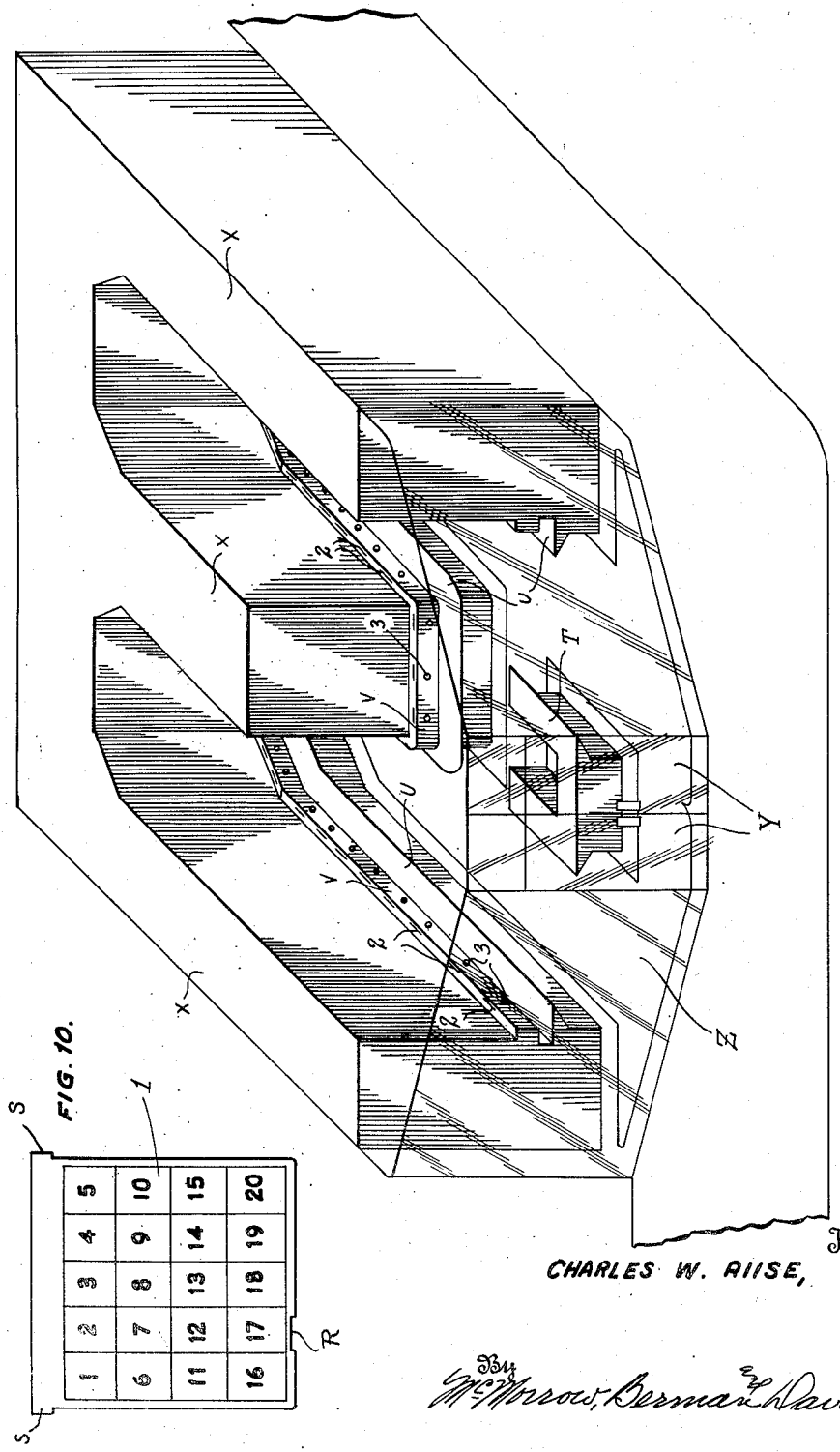
Figure 1 is a perspective view of a food store in accordance with this invention.
Figure 10:
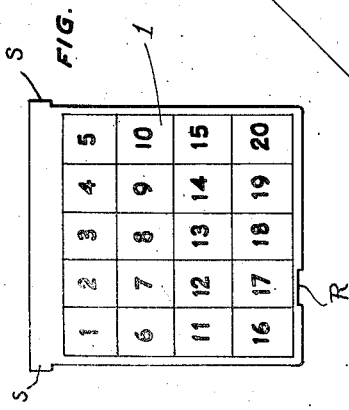
Fig. 10 is a plan view of the itemizing punch card.

Referring now to the accompanying drawings in which like numerals indicate similar parts throughout, Fig. 1 illustrates one of many feasible arrangements for a food package store in which the device of the present invention can be advantageously employed. The illustrated store arrangement comprises a transparent store front Z having entrance doors Y. The sidewalls of the store are lined with cabinet like structures X, here shown arranged in the shape of a W, which have a continuous projection V and an endless shelf U below this projection. The cabinet structures X house a plurality of dispensing mechanisms embodying this invention, the projections V being the forward portion of the casings of these mechanisms, and provided with a plurality of card slots 2, one for each mechanism, into which itemizing punch cards 1, shown in Figure 10, are adapted to be selectively inserted. The operating rods 3 of the individual dispensing mechanisms project forwardly from the front of the casings. The shelf U is provided to slidably support baskets or other package containers, so that such containers can be conveniently moved along beneath the projection V in position to receive packages dispensed from the underside of the projection V. A checker's or cashier's counter T is located substantially in the center of the store, to which the customers are required to bring their punched cards 1, for payment of the amounts printed thereon, and for wrapping of the packages purchased, if desired.

The punch card 1 is a strong, hard paper card of rectangular shape having laterally projecting tabs S at one end which prevent insertion of that end of the card in any of the card slots 2. The opposite or lower end edge of the card 1 has a cut-out or notch R which cooperates with means hereinafter described, to prevent effective insertion of the card in the slots 2 in reversed position.

The card is ruled vertically and horizontally into twenty or more areas, as desired by the store management, and each area may be subdivided to provide punch recording areas corresponding to a large number of different items, thereby providing for a sufficiently large variety of purchases to be recorded on a single card, to take care of the purchases of any customer. The cards 1 are placed in convenient locations throughout the store. Obviously the cards 1 serve as an accurate means for keeping a current record of the sales and stock of the store.

Each dispensing mechanism consists of a combined operating and card punching and printing mechanism A, such as shown in Figures 6, 7 and 8, and a dispensing mechanism, such as the cylindrical package dispensing mechanism B, shown in Figures 2 and 3, or the rectangular package dispensing mechanism B', shown in Figures 4 and 5.

The operating mechanism A, located in the forward cabinet projection V, in front of the related dispensing mechanism B or B', comprises, as shown in Figures 6 and 7, a horizontal operating rod 3 slidably mounted in front and rear bearings 3a and 3b, respectively, and having a handle 3c on its exposed forward end. Behind the rear bearing 3b the rod 3 is integral with or connects with portions of the related dispensing mechanism, as shown in Figures 2 and 4 for operating the same.

The card receiver 2a, which is supported with its upper end exposed above the top of the cabinet projection V is in the form of a vertically elongated plate having the vertically extending card slot 2 therein, into which a card 1 is adapted to be inserted until the lower edge of the card strikes the operating element of the main circuit closing switch SWC. The receiver 2a has mounted on one side thereof on headed pins 30a the pressure plate 26, which is normally urged away from the receiver by springs 30 on the pins, as shown in Figure 8. At a suitable location on the receiver 2a, decided by the recording area on the card 1 to be punched, the plate 26 and the receiver 2a have registered holes 25a and 25b, respectively, through which can operate the compressible material punch 25 carried by an extension 25c on the core 31 of the solenoid $S_2$ which is mounted on the plate 26. The solenoid core 31 is normally retracted during deenergization of the solenoid by a spring 32, so that the punch 25 is retracted to a position out of the slot 2, permitting insertion therein of a card 1. When the solenoid $S_2$ is energized the punch 25 passes through the card 1 and into the opening 25b so as to make a perforation in the card in an area thereof indicating the nature and number of packages dispensed by a single operation or several operations of the device.

On the opposite side of the card receiver 2a a bracket 17 supports, in alignment with the punch 25, a printing device $S_3$ which is electrically operated to project its printing terminal 17a at the time that the punch 25 is operated, so as to print a designation, such as the price of the item dispensed, on the back of the card 1.

The printing device $S_3$ is mounted on fixed horizontal guide rods 18 extending parallel to the reciver 2a and is moved progressively farther across the back of cards placed in the receiver in the course of successive operations of the device, by a threaded shaft 13 supported by the bracket 17 and forming part of the indexing mechanism, hereinafter described.

The operating rod 3, as shown in Figure 6, has at a rearward point thereof adjacent to the rear bearing 3b, a pin 11 working in a longitudinal slot 11a in the depressed rearward end of a pitman 9, whose forward elevated end is pivoted on a pin 10, secured to a normally horizontal ratchet lever 12, which has intermediate its ends a sleeve portion 12a pivoted on the adjacent end of the threaded shaft 13. The right hand end of the lever 12 is normally engaged under a vertically adjustable stop screw 14 by a contractile spring 15 stretched between the lever and a stationary bracket 14a. Pivoted at 8a on the opposite end of the lever 12 is a ratchet dog 8, with its operating end pointing in a clockwise direction with respect to the adjacent portion of the ratchet teeth 23 on the periphery of the ratchet wheel or indexing wheel 6 which is mounted on the shaft 13. A contractile spring 8a is stretched between the lever 12 and the operating end of the ratchet dog 8, so that the heel of the dog is normally engaged with a stop screw 7 so that the operating end of the ratchet dog is held out of contact with the indexing wheel 6, as shown in Figure 6.

The stop screw 7 is on the lower end of the vertical arm 7a of a bellcrank 4 which is pivotally mounted at 4a and has the horizontal arm 4b. The outer end of the horizontal arm 4b is pivoted to the upper end of a link 4c, which is in turn pivoted to the upper end of locking solenoid $S_1$, whose core 22 is normally depressed by a spring 22a into a notch 21 formed in a forward part of the operating rod 3, the rod 3 being in the inward position shown in Figure 6.

Another pivotally supported bellcrank 29 has one arm 29a pivoted at 29b to the forward part of the pitman 9 and another arm 28 having a cam 27 on its upper end riding against the forward side of the plate 26 on the receiver 2a. A spring leaf 5a projecting rearwardly from an intermediate part of the bellcrank 4 has a roller 5 at its rearward end for engaging behind any of the ratchet teeth 23 of the indexing wheel 6 whenever the indexing wheel has been rotated clockwise a distance of one of the teeth 23. A clock type spring 16 connected with the indexing wheel 6 serves to urge the wheel in the counterclockwise direction and to return the wheel to starting position after operation. As the wheel 6 is rotated, the threaded shaft 13 feeds the printing device $S_3$ across the card receiver 2a on the guide rods 18, in a sequence of operations hereinafter described.

Supported near the periphery of the indexing wheel 6 is a normally open switch $L_3$ having an operating element arranged to be engaged and closed by the final ratchet tooth 24 on the wheel.

Another normally open switch $L_6$ is located under the forward part of the operating rod 3 and has an operating element arranged to be closed when engaged by a depending cam portion 20 beneath the pin 11, when the rod 3 is in a fully pulled out position. In its fully pushed in position, shown in Figure 6, the cam portion 20 closes another switch $L_7$. In intermediate positions of the rod 3 the cam portion 20 is arranged to depress either end of a single operating element 60 of two longitudinally separated switches $L_2$ and $L_1$.

Referring now to Figures 2 and 3, showing dispensing mechanism B operated by the operating rod 3, for dispensing cylindrical packages 68, such as cans, such mechanism comprises a casing 100 being a riser portion of the cabinet structure X above and behind the projection V. The casing 100 includes front and rear walls 101 and 102, respectively, and opposite side vertical guides 103 and 104, respectively, between which front and rear vertical rows 71, 72, respectively, of cans 68 are arranged in reclining positions, the two rods being separated by a vertical partition 105. The lower ends of the guides 104 are spaced above the lower ends of the opposite side guides 103 to provide an aperture through which the upper and lower discharging racks 36 and 33, respectively, operate on guide rods 34, 34, the racks being operatively connected by an idler pinion 37, and the lower rack 33 being operatively connected to a portion of the operating rod 3 behind the cam portion 20. The racks have laterally inwardly extending concave portions 34a and 34b, respectively, which supportably engage under the next to lowest and the lowest cans 68, respectively, in the related tiers 71 and 72. As indicated in Figure 2, in a pulled out position of the operating rod 3, the lower rack 33 is in a forward position with its concave portion 34b engaged under the lowermost can in the front tier 71, while the concave portion 34a of the upper rack 36 is under the next to lowest can in the rear tier 72, a prior reversal of these positions of the racks having permitted the lowermost can in the rear tier to fall into the delivery chute 35 and the lower rack 33 to assume the forward position shown, wherein the next lowest can in the front tier dropped into position thereon while the upper rack 36 assumed a position under the next to lowest can in the rear tier 72. Obviously reciprocation of the operating rod 3 permits cans 68 to fall into the chute 35 alternately from the front and rear tiers 71 and 72. Spring pressed front and rear guides 105 and 106, respectively, engage adjacent ends of the cans 68 in the front and rear tiers, so as to desirably slow their gravitational drop toward discharging position, thereby saving strain and injury to the mechanism.

Supported on the guides 103 at a properly vertically spaced interval are switches $L_3$ and $L_4$ whose operating elements are engaged by cans 68 when present in the tiers 71 and 72 at these levels, whereby these switches are maintained in open position. The upper switch $L_3$ when closed indicates electrically that the tiers are full. The lower switch $L_4$ when opened by the drop of the cams therebelow indicates electrically that the supply of cans has been depleted below a predetermined level and should be replenished.

Referring now to the rectangular package dispensing mechanism B', shown in Figures 4 and 5, this mechanism comprises a casing portion 100 similar to that described above, containing sets of front and rear guides 105, 106 and side guides 104, forming spaces for a column of rectangular packages 68a, in side by side relation. The side guides 104 have spring means 104a urging them against the packages to slow down their gravitational fall as the lowermost packages are delivered or discharged and following packages subside and take their places. In this instance the rear part of the operating rod is operatively connected by the pin 11 working in a slot 42a in a link 42 to a link 44 pivoted in turn to cranks 43, 43 which operate transverse screws 45 on which sleeves 45a are threaded which carry between them a vertical pusher 46. As the push plate is moved under the column 71 it pushes the lowermost package thereof off the stationary stop plate 47 on which the lowermost packages of both columns rest, so that this pushed package falls into the delivery chute 48. The presence of the push plate 46 upon pushing a package off the stop plate 47 is under the then next lowest package in the same tier, whereby such package is prevented from following the first package into the chute. Movement of the pusher 46 in the opposite direction permits the next package from the column 71 to fall into delivery position on the plate 47 while pushing the lowermost package in the column 72 off the plate 47 and into the chute 48. The discharge of rectangular packages is thereby alternated from the two columns 71 and 72, as the operating rod 3 is reciprocated once for each package discharged.

As in the cylindrical package dispensing mechanism B, the rectangular package dispensing mechanism B', has upper and lower switches $L_3$ and $L_4$ on the side thereof whose operating elements 52 and 51, respectively, are held closed by engagement with the packages 68a and are permitted to open in the absence of packages 68a at their respective levels.

With reference to Figures 6, 7 and 9, full insertion of a punch card 1 in correct position in the slot 2 of the mechanism A closes the main switch SWC and energizes the circuit of Figure 9, which includes the time delay relay TDR, the relay contact R2-1, the card punch solenoid $S_2$, and the contacts TDR-1 and R2-1. Since the relay TDR has a slightly delayed action punch solenoid $S_2$ will operate first, but the core 31 of solenoid $S_2$ being limited to partial travel by the presence of the punch card 1, the solenoid contact $L_5$ is not closed to energize the relay $R_1$. As the operating rod 3 is pulled out or forwardly its cam portion 20 closes the normally open solenoid energizing switch $L_1$, and, upon further forward travel, sufficient to operate the indexing mechanism to position the printing device $S_3$, and operate the point solenoid, the normally open forward switch $L_2$ is closed by the cam 20, the cam 20 successively depressing the rearward and forward ends of the saddle 60. Further forward travel of the rod 3 permits the switches $L_1$ and $L_2$ to open, thereby deenergizing the printing solenoid $S_2$. Subsequent inward or rearward pushing of the operating rod 3 produces the same results as described above, except that the switch $L_2$ is operated in advance of the switch $L_1$. Removal of the punch card 1 from the slot 2 permits the main switch SWC to open and deenergize the entire circuit.

After operation of the rod 3 so that the maximum of six items for any one punch card, provided by the disclosed structure, has been dispensed from either type of dispensing mechanism, the limit switch $L_3$ operated by the final tooth 24 of the indexing wheel 6, closes so that the relay $R_2$ is closed and remains closed through the cooperation of the contact R2-1. On the sixth operation of the rod 3 with respect to a dispensing mechanism of either type, either the limit switch $L_6$ or the limit switch $L_7$, depending upon the direction of travel of the rod 3, is opened, and the circuit, except for relay $R_2$ is deenergized, thereby permitting the core 22 of the locking solenoid $S_1$ to drop into the corresponding one of the notches 21 in the rod 3 and thereby lock the rod 3 against further operation.

Insertion in a slot 2 of a card 1 previously used in the same mechanism energizes relay TDR and card punch solenoid $S_2$ by closing the main switch SWC as priorly explained. However, since a hole punched in the card 1 by a previous operation exists, the punch 25 of the solenoid $S_2$ will travel the full distance through the aligned holes 25a and 25b in the plate 26 and receiver 2a, so that the core 31 will engage and close the normally open contact L5, thereby energizing the relay R1. However, even though relay TDR closes, the locking solenoid S1 cannot be energized because contact R1, which must be closed before relay TDR2 can operate, is open, and the operating rod 3 remains locked and the mechanism cannot be operated.

Wrong insertion of a card 1 in the slot 2 precludes operation of the mechanism, because in that case the notch R in its lower edge will be in a wrong position to operate the main switch SWC.

If as a result of operation of the mechanism, the contents of the associated dispensing mechanism should subside below a predetermined level, the lower limit switch L4 closes and closes the relay R2 and opens the contact R2-1, with the consequence that as the operating rod 3 reaches the end of its travel in either direction, the corresponding one of the limit switches L1 and L2 is opened, whereby the circuit, with the exception of the relay R2, is deenergized, because one of the switches L1 and L2 and the contact R2-1 being open, the locking solenoid S1 is deenergized and its core 22 locks the operating rod in place and prevents its subsequent operation. The entire mechanism then remains inoperative until the related dispensing mechanism has been properly refilled with packages to the required level. A low content warning device, such as a lamp (not shown) is operable by the closing of the upper limit switch L8, when the packages are depleted to the refill level.

Operation of mechanism A

When a punch card 1 is inserted in the slot 2 and as a result solenoid S1 is operated to unlock the operating rod 3, the bellcrank 4 is moved so as to put the roller 5 against the back of the related one of the ratchet teeth 23 of the indexing wheel 6, and withdraw the stop screw 7 from the dog 8, thereby permitting the dog 8 to engage the periphery of the wheel 6. Thereafter, pushing or pulling the rod 3 causes the pitman 9 to pivot on the pin 10 on rocker 12, but until the length of the slot 11a in the pitman has been run by the pin 11, rocker 12 is not actuated. As the rod 3 approaches mid stroke and pin 11 reaches the end of the slot 11a, the rocker 12 is rotated clockwise, so as to rotate the wheel 6 clockwise a distance equal to one of its ratchet teeth 23. As the rod 3 is moved in the opposite direction to the end of its stroke, the length of the slot 11a permits the rocker 12 to resume its normal position against the stop screw 14 ready for another operation of the wheel 6, the detent roller 5 being engaged with one of the teeth 23 in a manner to prevent reverse or counterclockwise rotation of the indexing wheel 6, the spring 16 serving to hold the related tooth 23 against the detent roller 5. As hereinbefore stated, rotation of the wheel 6 rotates the threaded shaft 13 in the same direction and drives the printing device bracket 17 along the guide rods 18. The printing solenoid S3 whose printing element 19 is of conventional changeable type, is adjustably fastened to the bracket 17 so that it can be positioned at a different place therealong for each dispensing device, so that the cards 1 inserted therein will be printed in the correct areas thereof to properly designate the kind of packages dispensed. As the rod 3 is successively operated, the printing device is progressively moved to new positions across the bracket 17.

After the rod 3 has been pulled out and has produced the above described actions of the associated mechanism, and the rod 3 is then pushed rearwardly to complete a reciprocation thereof, the cam 20 on the rear part of the rod first closes the limit switch L2, then the rear limit switch L1, whereupon the rod 3 is in position, upon further rearward travel, to operate the indexing mechanism and energize the printing solenoid S3, so as to cause the printing device 19 to print upon the back of the card 1. Subsequent travel of the rod 3 in the forward direction produces successive operation of the limit switches L6 and L7 so as to deenergize the locking solenoid S1 and cause locking of the rod 3. The slots 21 in the rod 3 are proportioned in length so that either of them comes into position under the core 22 of the locking solenoid S1 prior to the end of the stroke of the rod and the release of a package 68 or 68a from the associated dispensing mechanism B or B' can take place.

Whenever six operations of a dispensing mechanism have taken place, the leading one of the ratchet teeth 23 engages and opens the limit switch L3, with consequences already explained. Removal of a card 1 from the slot 2 not only deenergizes the circuit and locks the rod 3 in place as descoribed, but the bellcrank 4 and rocker 12 return to their starting positions, illustrated in Figure 6, in the course of which the spring 16 is freed to rotate the indexing wheel 6 in a counterclockwise direction to its starting position.

The cams 27 on the bellcrank 29 are operated against the plate 26 on the card receiver 2a upon each stroke of the rod 3 and operation of associated parts as above described, so that the punch 25 and plate 26 are moved toward and away from the receiver 2a, the springs 30 serving to retract the plate 26 as the high points of the cams 27 recede.

Having thus fully described this invention what I claim as new and desire to secure by Letters Patent is:

1. In package dispensing apparatus, a support having a pair of vertical portions in each of which a vertical column of packages is adapted to be positioned, the packages being in superimposed relation and free to subside gravitationally in said support portions, a chute beneath both of said support portions into which the lowermost packages of the columns can fall, retaining means mounted on said support, said means comprising a pair of stops arranged in vertical spaced relation, means mounting said stops for endwise movement in separate horizontal paths, said stops normally occupying positions in which they are in supporting engagement with the lowermost packages of the columns and prevent such packages from falling into said chute, and operating means connected to said stops for simultaneously moving said stops in their separate paths in opposite directions so as to remove one of the pair of said stops from supporting engagement with the lowermost package of one of the pair of columns and permit such package to fall into the chute and to shift the other of the pair of stops into position for supporting engagement with the lowermost package of the other of the pair of columns, said stops having racks thereon, said operating means comprising a pinion positioned between said stops and meshed with said racks, and a rod connected to one of said stops for moving said one stop lengthwise of its rack.

2. In package dispensing apparatus, a support having a pair of vertical portions in each of which a vertical column of packages is adapted to be positioned, the packages being in superimposed relation and free to subside gravitationally in said support portions, a chute beneath both of said support portions into which the lowermost packages of the columns can fall, retaining means mounted on said support, said means comprising a pair of stops arranged in vertical spaced relation, means mounting said stops for endwise movement in separate horizontal paths, said stops normally occupying positions in which they are in supporting engagement with the lowermost packages of the columns and prevent such packages from falling into said chute, and operating means connected to said stops for simultaneously moving said stops in their separate paths in opposite directions so as to remove one of the pair of said stops from supporting engagement with the lowermost package of one of the pair of columns and permit such package to fall into the chute and to shift the other of the pair of stops into position for supporting engagement with the lowermost package of the other of the pair of columns, said stops having racks thereon, said operating means comprising a pinion positioned between said stops and meshed with said racks, and a rod connected to one of said stops for moving said one stop lengthwise of its rack, locking means normally engaging a portion of said rod and preventing operation thereof, and card operated means connected to said locking means for releasing said locking means.

3. In package dispensing apparatus, a support comprising means for confining a pair of vertical stacks of packages in laterally adjacent relation with the packages free to subside gravitationally relative to each other and to the support as packages are dispensed from the lower ends of the stacks, and dispensing means comprising a pair of stop members, means mounting said stop members for movement relative to each other and to the support in horizontal planes, said stop members being vertically spaced from each other at a distance at least as great as the vertical dimension of a package, and operating means operatively connected to the stop members for moving said stop members simultaneously in opposite directions so that said stop members exchange positions beneath and in supporting relation to the lowermost packages of the stacks, the withdrawals of the stop members from supporting relation to the lowermost packages of the stacks incident to exchange of positions of the stop members beneath the stacks serving to alternately free lowermost packages of the stacks to fall from the stacks and serving to restore stop members to supporting relation to next lowermost packages of the stacks preparatory to subsequent exchanges of position of the stop members for dispensing additional packages from the stacks.

CHARLES W. RIISE.

REFERENCES CITED

The following references are of record in the file of this patent:

UNITED STATES PATENTS

| Number | Name | Date |
|---|---|---|
| 1,696,447 | Paulson | Dec. 25, 1928 |
| 1,816,887 | Adams | Aug. 4, 1931 |
| 2,127,769 | Esgro | Aug. 23, 1938 |
| 2,142,053 | Hoban | Dec. 27, 1938 |
| 2,276,293 | Farmer | Mar. 17, 1942 |
| 2,276,294 | Farmer | Mar. 17, 1942 |
| 2,353,002 | Armbruster | July 4, 1944 |
| 2,371,845 | Robison | Mar. 20, 1945 |
| 2,374,537 | Goldsmith | Apr. 24, 1945 |
| 2,438,503 | Holt | Mar. 30, 1948 |